Patented Mar. 26, 1929.

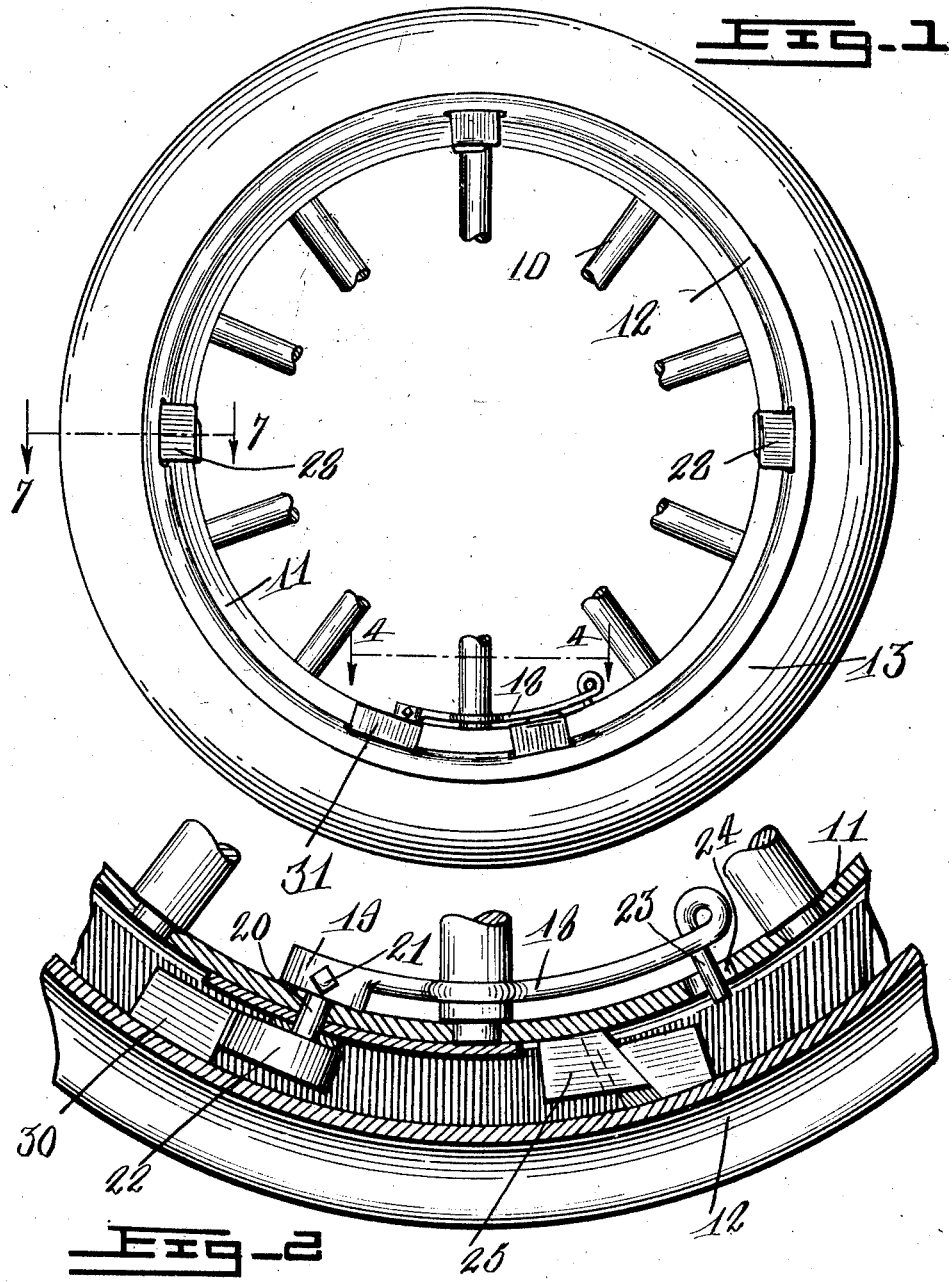

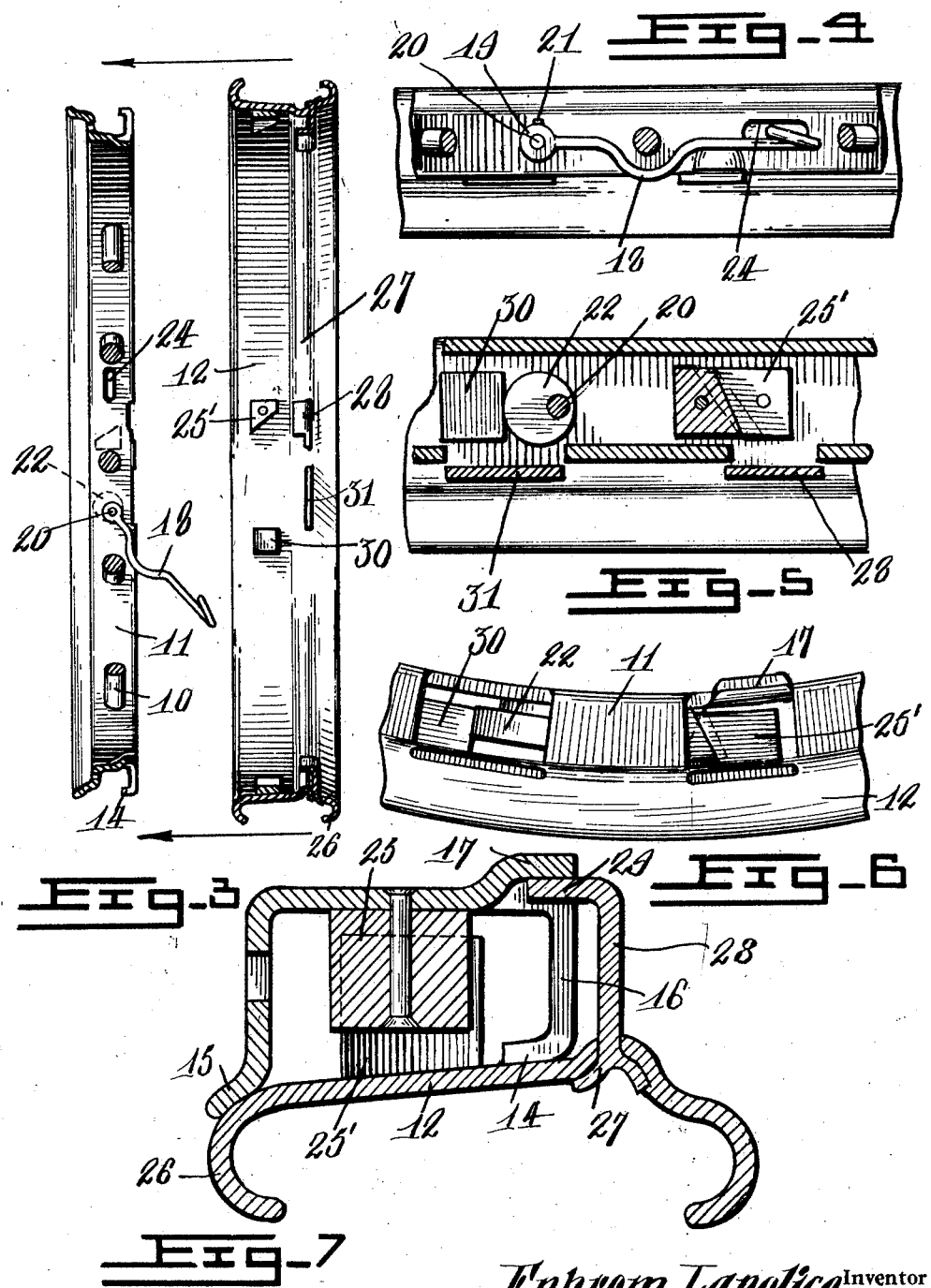

1,707,060

UNITED STATES PATENT OFFICE.

EPHREM LAPOLICE, OF SAULT AUX RECOLLETS, MONTREAL, QUEBEC, CANADA.

VEHICLE WHEEL.

Application filed April 9, 1927. Serial No. 182,481.

The present invention relates to improvements in vehicle wheel construction and has for its primary object to provide a demountable rim detachably engageable with a complementary felly ring.

A further object of the invention is to provide a detachable rim structure which can be quickly and securely mounted in operative position on a wheel and detached therefrom.

Another object of the invention is the provision of a demountable rim which can be securely locked on the wheel so as to obviate the danger of accidental displacement.

Another object of the invention is to provide a complementary felly ring and demountable rim which will be relatively simple of construction, and which can be manufactured at a low cost.

Other objects and advantages of the invention will become apparent as the description progresses.

In the accompanying drawings forming a part of this specification and in which like reference characters are employed to designate corresponding parts throughout the same.

Figure 1 is a side elevational view of a wheel constructed in accordance with my invention.

Figure 2 is an enlarged vertical sectional view taken through the locking structure of the wheel;

Figure 3 is a transverse sectional view through the felly ring and rim in separated positions;

Figure 4 is a fragmentary top plan view taken on the line 4—4 of Figure 1;

Figure 5 is a similar view with the felly ring removed;

Figure 6 is a fragmentary side elevational view with the closure plates removed, and Figure 7 is an enlarged transverse sectional view taken on the line 7—7 of Figure 1.

Referring to the drawings, wherein for the purpose of illustration is shown the preferred embodiment of my invention, the numeral 10 generally designates an automobile wheel, in the present instance, provided with a special felly ring 11. Formed for detachable engagement with the felly ring 11 is a rim 12 adapted to engage a pneumatic tire 13. An essential feature of the present invention resides in the provision of a novel form of demountable rim constructed for engagement with the felly of the wheel and arranged so as to be tightly locked in position thereon.

Referring particularly to the construction of the felly ring 11, it will be noted that this member is substantially channel shaped in cross section, the outer side being provided with an interiorly directed flange 14. The other side of the felly is formed with an inwardly directed flange 15 designed to accurately engage the inner edge of the tire rim. At regular spaced intervals, the outer felly flange is cut away to form recesses 16, the adjacent peripheral portion of the felly being formed to provide outwardly directed radially offset flanges 17. Pivotally connected with the interior surface of the felly and movable in an arc thereon is a locking rod 18, one end being formed with an ear 19 apertured to receive a pivot pin 20 secured to the ear by means of a set screw 21. The pivot pin 20 rotatably projects through a circular opening in the felly and on the outer end carries a cam member 22 embodying an eccentrically mounted disc fixed on a pivot and rotatable therewith. The opposite end of the rod 18 is bent to form a right angular radially extending finger 23 engageable with an elongated slot 24 in locked position.

The intermediate portion of the rod 18 is formed with an arcuate offset to clear the intermediary wheel spoke.

Rigidly attached to the outer surface of the peripheral felly band at spaced intervals corresponding to the recesses 16 in the outer flange of the felly are blocks 25 generally rectangular in formation with one of the transverse faces having slight angular inclination and a corresponding inclination from the upper to the lower edge of the inclined surface.

With particular reference to the demountable rim structure, it will be noted that the present embodiment of the rim 12 is formed with inwardly curved clincher flanges 26. The rim is formed with an annular interiorly projecting ridge or corrugation 27 formed adjacent the outer edge. The rim 12 also carries blocks 25' arranged in co-acting positions with respect to the blocks secured to the felly, and formed with an angular edge for interlocking engagement with the blocks of the felly ring. Attached to the rim and projecting radially inward are a plurality of plates 28 formed with angular flanges 29 at their inner edges arranged to register with the recesses of the felly ring in the assembled portions of the felly and the rim.

Rigidly attached to the interior surface of the rim 12 and arranged to engage the cam disc 22 in locking position, is a lug 30 generally rectangular in formation and extensible through a recess formed in the inner flange of the felly. The recess through which the lug is laterally inserted is covered by a radial plate 31 to prevent the entrance of dirt and the like.

In use, the rim 12 upon which is ordinarily fitted a tire casing 13 may be conveniently and quickly attached in operative position upon a felly of the type described by initially arranging the lugs 25' of the rim in transverse alignment with the recesses in the outer flange of the felly and laterally sliding the rim upon the felly. During this operation, the rod 18 is swung backward to an inoperative position as disclosed in Figure 3.

After the rim has been positioned upon the felly the rod 18 is swung to a forward locking position as shown in Figures 2 and 4 and secured against accidental displacement by the extension of the finger 23 through a slot 24. The eccentrically pivoted disc 22 will receive a corresponding rotary movement engaging the lug 30 and imparting a rotary movement to the rim so that the co-acting blocks 25 mounted on the felly and rim will be brought in contact and thus prevent lateral as well as rotary concentric movement of the felly ring and demountable rim.

In locked position, the rim and felly will assume inter-locking positions as shown in Figure 7, the intermediate body of the rim having an inward taper corresponding to the offset position of the outer and inner felly ring flanges 14 and 15 respectively. Furthermore, the inwardly offset flanges 17 will be slidably fitted over the flanges 29 of the cover plates 28 so that the felly is positively held against sliding entirely through the rim.

It is to be understood that the form of my invention herewith shown and described is to be taken as the preferred example of the same, and that various changes as to the shape, size and arrangement of parts may be resorted to without departing from the spirit of the invention or the scope of the subjoined claim.

Having thus described my invention, I claim:

The combination with a vehicle wheel felly, an inner and outer flange formed with said felly to provide a channel way therebetween, blocks formed with the felly and projecting within the channel way thereof, said outer flange having openings therein adjacent each block, an offset flange formed with the felly adjacent each recess, a demountable tire rim receivable upon said felly, blocks carried by said rim adapted to be inserted through said recess and having locking engagement with the blocks of said felly, plates formed with said rim and adapted to extend over said recesses when the rim is mounted upon the felly, and angular flanges formed with said plates receivable by said offset flanges of the felly.

In witness whereof I have hereunto set my hand.

EPHREM LAPOLICE.